United States Patent [19]
Parris

[11] B 3,923,552
[45] Dec. 2, 1975

[54] HERMETICALLY SEALED THERMOCOUPLE ASSEMBLY

[75] Inventor: Joseph N. Parris, Irwin, Pa.

[73] Assignee: PPG Industries, Inc., Pittsburgh, Pa.

[22] Filed: Dec. 21, 1972

[21] Appl. No.: 317,347

[44] Published under the Trial Voluntary Protest Program on January 28, 1975 as document no. B 317,347.

[52] U.S. Cl. .............. 136/234; 136/242; 136/227; 73/359
[51] Int. Cl.² ....................................... H01V 1/02
[58] Field of Search ...... 136/227, 232, 234; 73/341, 73/359; 285/187

[56] References Cited
UNITED STATES PATENTS

| | | | |
|---|---|---|---|
| 2,888,508 | 5/1959 | Rademacher | 73/359 |
| 3,263,502 | 8/1966 | Springfield | 136/232 |
| 3,512,413 | 5/1970 | Krusenstierna et al. | 136/227 |
| 3,537,911 | 11/1970 | Hynd | 136/234 |

FOREIGN PATENTS OR APPLICATIONS

| | | | |
|---|---|---|---|
| 696,438 | 10/1964 | Canada | 285/187 |
| 1,012,896 | 12/1965 | United Kingdom | 285/187 |

*Primary Examiner*—Verlin R. Pendegrass
*Attorney, Agent, or Firm*—Donald Carl Lepiane

[57] ABSTRACT

A thermocouple assembly has an outer sheath positioned about a thermocouple probe. The outer sheath includes a casing and a tube joined at one end about a washer to form a hermetic seal at room temperature capable of withstanding atmospheric pressure. The casing, tube and washer each have different coefficients of expansion to form a hermetic seal when the outer sheath is heated capable of withstanding pressures in excess of 1,000 psi. The thermocouple probe has a plurality of thermocouple elements hermetically sealed in an inner sheath. The thermocouple elements are mutually aligned and spaced a predetermined distance from each other at the measuring junction. A hermetic seal is provided at the union of the outer sheath and the thermocouple assembly.

14 Claims, 1 Drawing Figure

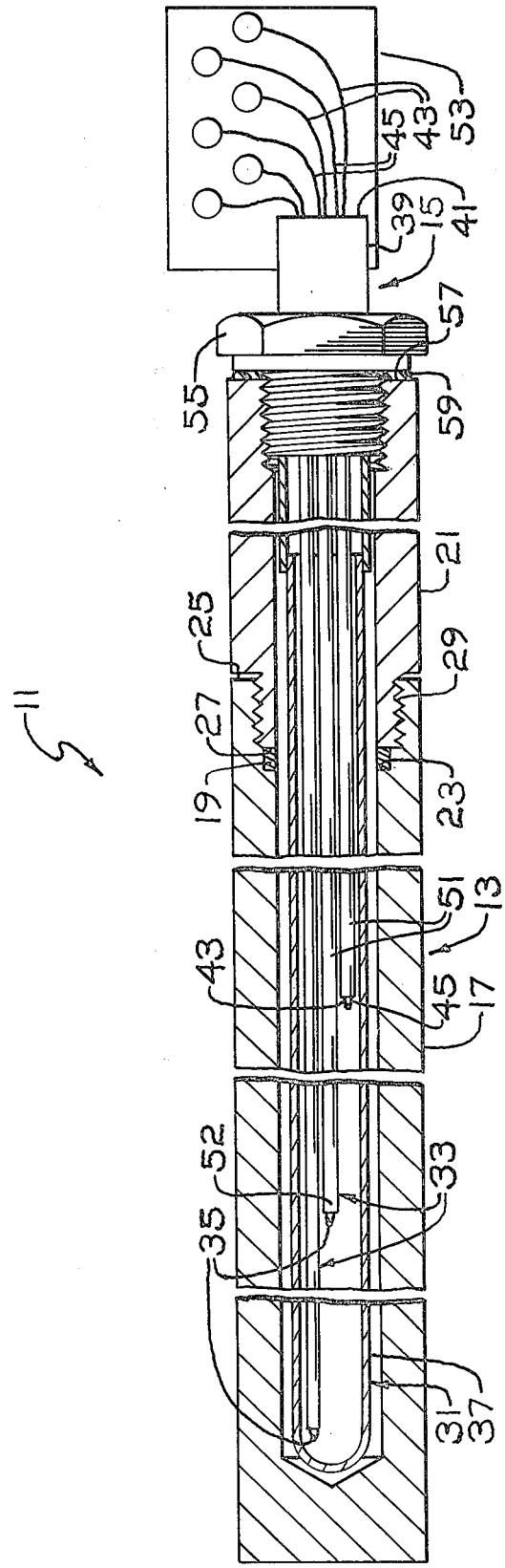

HERMETICALLY SEALED THERMOCOUPLE ASSEMBLY

BACKGROUND OF THE INVENTION

1. Field of the Invention

This invention relates to those classes of thermocouple assemblies having a gas therein that are used for measuring elevated temperatures wherein the gas upon heating expands within the assembly.

2. Discussion of the Prior Art and Typical Problems

In the manufacture of float glass, it is desirous to know the temperature of a molten pool of glass in the melting tank at different depths and at different locations. It has been found that when the temperature at a given depth varies between locations that the subsequently formed glass sheets are not of high quality. For example, if the temperature at a first location is higher than the temperature at a second location for the same depth, the convection flow of glass is faster at the first location. Conversely, if the temperature at a first location is lower than the temperature at a second location for the same depth, the convection flow of glass is slower at the first location. It is believed that different rates of convection flow cause ream in subsequently formed glass sheets.

In general, the temperature profile of a molten pool of glass is determined by inserting a plurality of thermocouples at selected locations through the bottom of a melting furnace into a molten pool of glass. Each of the thermocouple probes have an outer sheath positioned over a plurality of mutually aligned thermocouple elements spaced a predetermined distance from each other at the measuring junction. The outer sheath is made of a material that is not readily attacked by the molten glass and is structurally strong at extended lengths. Although platinum does not react with the molten glass, it is not considered structurally strong when heated to temperatures in excess of 2,800°F. In practice, the sheaths are normally made of a refractory metal, e.g., molybdenum, which is less expensive and structurally strong at temperatures in excess of 2,800°F.

Although molybdenum is suitable from a structural standpoint, it is readily oxidized when heated in the presence of air or oxygen. When the molybdenum oxidizes, it deteriorates and the thermocouple elements become exposed to the molten glass. The probe is thereafter discarded. The probe may be exposed to air or oxygen at three places. They are: (1) the surface of the probe exposed to the molten glass, (2) the inner surface of the probe into which air diffuses, and (3) the outer surface of the probe extending out of the molten glass.

As is well known, molybdenum does not readily react with the oxygen in the molten glass. The deterioration is, therefore, slow. Because molybdenum is relatively inexpensive and structurally strong, the deterioration due to oxygen in the molten glass is compensated for. This is done by making the outer sheath thick, i.e., about 1 inch, to extend the life of the probe.

To eliminate the presence of air in the outer sheath, it is common practice to continuously purge the probe with forming gas. This is accomplished by connecting purging facilities to the end of the probe outside the furnace. Forming gas is continually moved into the sheath to keep the inside of the sheath at positive pressures.

To prevent the end of the probe exposed to the atmosphere from oxidizing, it is common practice to join a stainless steel sleeve to the molybdenum sheath. As is well known, stainless steel does not readily oxidize when heated in air, i.e., below temperatures of 1,700°F. The stainless steel sleeve is brazed to the molybdenum sheath. However, when the probe is heated, the brazed joints have a high incidence of fracturing. This is attributed to the fact that the stainless steel and molybdenum have different coefficients of expansion and the forming gas upon heating expands, thereby increasing the pressure within the probe. When the brazed joint fractures, air and/or molten glass move into the sheath deteriorating the sheath and/or thermocouple elements.

Another drawback to the prior art thermocouple is the fact that when the sheath deteriorates, the probe must be discarded. As is well known, probes having a plurality of mutually aligned thermocouples are expensive from a construction and material standpoint. The thermocouple elements are made of platinum or an alloy of platinum and rhodium. To discard probes because the outer sheath has deteriorated is an expensive practice.

It would therefore be advantageous from an economic standpoint if a multi-depth high temperature thermocouple assembly could be provided which (1) does not require purging, and (2) eliminates the need for replacing the thermocouple probe. Further, it would be most advantageous if a sheath were provided of dissimilar metals that is hermetically sealed at high temperatures and capable of maintaining the seal under high pressures.

SUMMARY OF THE INVENTION

This invention relates to a thermocouple assembly having an outer sheath and a thermocouple probe mounted within the outer sheath. The outer sheath is composed of a metal case, e.g., a molybdenum case, having an inner ledge formed adjacent the open end. A metal washer, e.g., a naval bronze washer, is mounted on the inner support ledge and has a coefficient of expansion greater than the metal case. A metal tube, e.g., a stainless steel tube, has a first end securely positioned in the open end of the metal case and urges the metal washer against the inner support ledge to form a hermetic seal at room temperature and atmospheric pressure. The metal tube has a coefficient of expansion that is equal to or greater than the metal case but less than the metal washer.

A thermocouple probe is inserted into the outer sheath and an inert atmosphere is provided therebetween. A hermetic seal is formed at the union of the thermocouple probe and the outer sheath to contain the inert atmosphere within the outer sheath.

When the thermocouple assembly is inserted into a molten pool of glass, the elevated temperature expands the metal washer and the gas. As the washer expands, it moves into engagement with the inner wall of the metal case, the inner support ledge and the end of the metal tube. As the metal washer expands, it is elastically deformed. Simultaneously, provided the metal tube has a coefficient of expansion larger than the metal case but less than the metal washer, the following occurs. The metal tube expands into engagement with the metal washer and the inner wall of the metal case. In this manner, a hermetic seal is formed between the metal case and the metal tube at elevated temperatures capable of withstanding high pressure, e.g., 1,000 psi, generated by the expanding inert gas.

BRIEF DESCRIPTION OF THE DRAWING

The drawing illustrates a thermocouple assembly embodying the principles of this invention and having portions cut away for clarity of illustration.

DESCRIPTION OF THE INVENTION

Shown in the drawing is a multi-depth thermocouple assembly 11 having an outer sheath 13 and a thermocouple probe 15 positioned therein. The thermocouple assembly 11 may be used for simultaneously measuring temperature at different depths at a given location in a molten pool of glass, metal or the like.

In general, the outer sheath 13 includes a metal case 17, a metal washer or ring 19 and a metal tube 21. The case 17 has an inner support ledge 23 adjacent end 25 of the case for supporting the washer 19. The case 17 is extended into a molten pool of glass (not shown) and heated to temperatures of about 2,700°F. Therefore, the case should be made of a metal that does not readily react with oxygen in the molten glass and has structural strength when heated. One such group of metals are known as refractory metals, e.g., molybdenum. Since molybdenum does react with the molten glass at a slow rate, it is recommended that the wall thickness be greater than about ¾ inch. The expected usable life of the sheath 13 will be about 3 to 4 years.

The washer 19 should be of a metal having a coefficient of expansion greater than the metal case 17. As will be appreciated, heating the outer sheath 13 expands the metal washer 19 to form a hermetic seal between the case 17 and the tube 21 capable of withstanding high pressures. One such metal is naval bronze.

The metal tube 21 has an end 27 securely positioned as by threads 29 into the end 25 of the case 17. The end 27 is urged against the washer 19 forming a hermetic seal between the tube 21 and the case 17 capable of withstanding atmospheric pressure at room temperature. The need to securely join ends 25 and 27 of the case 17 and the tube 21, respectively, becomes readily apparent when it is realized that the metal washer 19 expands upon heating. The tube 21 is made of a metal having a coefficient of expansion that is equal to or greater than the metal case 17 but less than the metal washer 19. Further, the tube should be made of a metal that does not oxidize when heated in air at temperatures of about 1,500°F. One such group of metals are the various stainless steels.

The thermocouple assembly 11 is positioned into a molten pool of glass (not shown) such that the glass covers the case 17 to protect the case 17 from the atmosphere. As the outer sheath 13 is heated, the washer 19 expands into engagement (1) with the inner walls of the case 17 adjacent the support ledge 23, (2) with the end 27 of the tube 21, and (3) with the support ledge 23. Further, as the washer expands, it is elastically deformed. When a tube 21 is provided having a larger coefficient of expansion than the case 17 but less than the washer 19, in addition to the washer expanding, the tube 21 expands. As the tube 21 expands, the end 27 of the tube 21 is further moved into engagement (1) with the metal washer 19, and (3) with the inner walls of the case 17 at the end 25. A hermetic seal is formed between the ends 25 and 27 of the case 17 and the tube 21, respectively, by the different expansions of the metals. The hermetic seal formed is capable of withstanding high pressures, e.g., above 1,000 psi.

As can be appreciated by those skilled in the art, the thickness of the case 17 at the end 25 should be of sufficient thickness to withstand the expansion of the tube 21 and metal washer 19 without fracturing. Also the washer 19 should be of dimensions sufficient to complement the hermetic sealing of the case 17 and the tube 21 without exerting excessive force against the inner wall of the case 17. Further, the dimensions of the end 27 of the tube 21 should be selected to sufficiently expand to complement the hermetic sealing of the outer sheath 13 but not sufficient to cause the end 25 of the case 17 to fracture.

Referring to the drawing, the thermocouple probe 15 includes an inner sheath 31 disposed about a plurality of mutually aligned thermocouple elements 33—33. The thermocouple elements are spaced a predetermined distance from each other at their hot or measuring junction 35—35; the distance corresponding to the depths of the molten pool of glass at which the temperature is to be measured.

The inner sheath 31 is preferably made of a metal case 37 having a high melting point, i.e., above 1,900°F., brazed to a metal sleeve 39 made of metal that does not readily oxidize when heated in air. The metal case 37 may be made of any refractory metal, e.g., molybdenum, and the sleeve 39 may be made of any of the various stainless steels. The need for metals having the preceding characteristics becomes readily apparent when it is realized that (1) the case 37 is exposed to the temperatures of the molten glass, and (2) an end 41 of the sleeve 39 extends beyond the outer sheath to provide electrical access to the measuring junction 35—35. As will be appreciated, a hermetic seal is preferred but not required between the case 37 and the sleeve 39. Therefore, if the joint is brazed and fractures due to differences in coefficients of expansion of the metals, it is of no consequence. The spacing between the inner surface of the outer sheath 13 and the outer surface of the thermocouple probe 15 is preferably maintained at a minimum, e.g., about 1/16 inch. This will minimize the air space between the outer sheath 13 and the probe 15.

Each of the thermocouple elements 33—33 includes a pair of fine gauge wires 43 and 45 located in longitudinal passageways (not shown) of a double-bored ceramic tube 51. As is well known in the art, one of these wires may be 94 percent platinum, 6 percent rhodium, and the other 70 percent platinum, 30 percent rhodium. The wires 43 and 45 are electrically connected together to form the hot or measuring junction 35—35 at an end 52 of the tube 51. Preferably, the thermocouple elements 33—33 should be of sufficient length to extend beyond the end 41 of the sleeve 39. As is well known in the art, the free ends of the wires 43 and 45 are connected to a multiple thermocouple connector block 53 which may be mounted on the end 41 of the sleeve 39.

The end 41 of the sleeve 39 is hermetically sealed about the thermocouple elements 33—33 with any well-known adhesive. The hermetic seal prevents air from diffusing into the probe 15. This prevents air from moving from the probe into the outer sheath 13 if the brazed joint between the case 37 and sleeve 39 fractures. Further, if the case 37 is made of molybdenum, it prevents air from diffusing into the probe 15 and deteriorating the molybdenum. Prior to applying the adhesive, it is recommended that the case 37 of the probe 15 be swedged to eliminate any cavities present therein, thereby minimizing the presence of air in the case 37 and provide support for the thermocouple elements. Preferably, after swedging the probe 15, it is filled with an inert gas to further eliminate the presence of air in the probe.

The thermocouple probe 15 is positioned in the outer sheath 13 and hermetically sealed therein in any conventional manner. For example, a nut 55 may be brazed onto the end 41 of sleeve 39 and threaded into end 57 of the metal tube 21 about an O-ring 59. The nut 55, sleeve 39 and tube 21 should be made of the same metal so that the expansion upon heating will be similar. It has been found that this type of hermetic seal is capable of withstanding pressures in excess of 1,000 psi.

Although not necessary but recommended to minimize oxidation of the outer surface of the probe 15 and the inside surface of the outer sheath 13, the outer sheath may be filled with an inert gas such as nitrogen or argon. The hermetic seal formed by the metal washer 19 and the threaded nut 55 maintains the inert atmosphere in the outer sheath while keeping air out at room temperatures. At elevated temperatures, the gas expands increasing pressure within the sheath. The hermetic seal formed by the different rates of expansion of the case, sleeve and washer provide a seal capable of withstanding pressures in excess of 1,000 psi.

A plurality of thermocouple assemblies 11 are normally inserted at preselected positions into the bottom of a melting furnace (not shown) a sufficient distance so that the case 17 of each assembly 11 is completely covered by the molten glass. The molten glass protects the case 17 from the atmosphere. A temperature indicating device (not shown) is advantageously connected to the connector block 53 of each assembly 11 to obtain a temperature profile of the molten pool of glass (not shown). As the thermocouple assembly 11 is used over a long period of time, e.g., 3 to 4 years, the oxygen in the molten glass deteriorates the case 17 of the outer sheath 13. When this occurs, the thermocouple probe 15 may be removed and inserted as before into a new outer sheath.

Detailed Description

Shown in the drawing is a thermocouple assembly 11 for simultaneously measuring preselected depths of a molten pool of glass (not shown) at a given location therein. The thermocouple assembly 11 has a thermocouple probe 15 positioned in an outer sheath 13 filled with nitrogen. The probe 15 is joined to the outer sheath 13 by way of stainless steel nut 55 brazed as by a silver palladium braze to a stainless steel sleeve 39 of the probe 15. The nut is threaded into end 57 of a stainless steel tube 21 about an O-ring 59 to form a hermetic seal at the union of the outer sheath 13 and the probe 15 capable of withstanding pressure of 1,000 psi. The outer sheath 13 has an outside diameter of 1-¼ inches, an inside diameter of ½ inch and an overall length of 72 inches. The thermocouple probe 15 has an outside diameter of ⅜ inch and an overall length of 75 inches.

The outer sheath 13 includes a molybdenum case 17, a naval bronze washer 19 mounted on inner support ledge 23 of the case 17, and the stainless steel tube 21 having an end 27 threaded into end 25 of the case 17 against the washer 19. The molybdenum case 17 which is 48 inches in length has an inside diameter from the support ledge 23 to the end 25 of approximately ¾ inch. The washer 19 is about ¼ inch thick and has an outside diameter of approximately ¾ inch. The tube 21 is 25-¼ inches in length. The end 27 of the tube 21 has an outside diameter of about ¾ inch extending 1-¼ inches along the length thereof from the end 27.

The thermocouple probe 15 has an inner sheath 31 including a molybdenum case 37 brazed to the stainless steel sleeve 39 using a silver palladium braze. The case 37 has a length of about 54 inches and a wall thickness of 0.030 inch. The sleeve has a length of about 21 inches and a wall thickness of 0.030 inch. A plurality of mutually aligned thermocouple elements 33—33 are spaced a predetermined distance apart, e.g., 6 inches, from their measuring junction 35 and extend beyond the sleeve 39. The molybdenum case is swedged to remove air cavities therein and filled with argon. End 41 of the sleeve 39 is thereafter hermetically sealed by any well-known adhesive. The free ends of wires 43 and 45 of each of the thermocouple elements 33—33 are advantageously connected to connector block 53 mounted on the end 41 of the sleeve 39.

A plurality of the thermocouple assemblies 11—11 are inserted at preselected positions through the bottoms of a glass melter (not shown) into the molten glass. The assemblies 11—11 are positioned in the molten glass such that the molten glass covers the case 17 of the outer sheath 13 to protect the case 17 from the atmosphere.

The coefficient of expansion of molybdenum, naval bronze and stainless steel is $3 \times 10^{-6}$ inch/inch/°F., $12 \times 10^{-6}$ inch/inch/°F. and $6 \times 10^{-6}$ inch/inch/°F., respectively. When the outer sheath is heated, the washer 19 and the nitrogen expand. The washer expands into engagement with the inner wall of the case 17, the end 27 of the tube 21, and the support ledge 23. As the washer 19 expands, it is elastically deformed. Simultaneously with the washer 19 expanding, the tube 21 expands. As the end 27 of the tube 21 expands, it is further moved into engagement with the washer 19 and the inside surface of the case 17 at the end 25. A hermetic seal is formed at the union of the case 17 and the tube 21 capable of withstanding pressure in excess of 1,000 psi.

A temperature indicating device is advantageously connected to the connector blocks 53 (one shown) and a temperature profile of the furnace is taken.

As can be appreciated, the thermocouple assembly of this invention eliminates the need of purging equipment. Further, it provides an outer sheath of dissimilar metals that is hermetically sealed at elevated temperatures and capable of withstanding pressure in excess of 1,000 psi.

What is claimed is:

1. A thermocouple assembly, comprising:
   an outer sheath, comprising: a metal case having an open end and a closed end;
   an inner support ledge adjacent the open end of said metal case;
   a pressure deformable metal washer positioned on said inner support ledge of said metal case, said washer having a coefficient of expansion greater than said metal case;
   a metal tube having a first end and a second end, the first end being insertable in the open end of said metal case against said metal washer, said metal tube having a coefficient of expansion at least the same as the metal case but less than said metal washer; and
   means for securing the first end of said metal tube in the open end of said metal case with the first end of said tube against said washer to prevent the first end of said metal tube and of said metal case from separating when said outer sheath is heated to expand at least said metal washer to form a hermetic seal at the union of said case and said tube capable of withstanding high pressures;

a thermocouple probe mounted in said sheath; and means for forming a hermetic seal between said thermocouple probe and the second end of said metal tube to contain an atmosphere within said outer sheath.

2. The thermocouple assembly as set forth in claim 1 wherein said metal tube has a coefficient of expansion greater than said metal case but less than said metal washer.

3. The thermocouple assembly as set forth in claim 1 wherein said metal case is made of a refractory metal.

4. The thermocouple assembly as set forth in claim 1 wherein said metal washer is made of naval bronze.

5. The thermocouple assembly as set forth in claim 1 wherein said metal tube is made of stainless steel.

6. The thermocouple assembly as set forth in claim 1 wherein said thermocouple probe comprises:
   a. an inner sheath,
   b. a plurality of thermocouple elements mutually aligned and spaced a predetermined distance from each other positioned in said inner sheath, and
   c. means for forming a hermetic seal between said thermocouple elements and said inner sheath at the open end of said inner sheath.

7. The thermocouple assembly as set forth in claim 6 having an inert atmosphere between said outer sheath and said inner sheath.

8. The thermocouple assembly as set forth in claim 7 wherein said inner sheath comprises a molybdenum case and a stainless steel sleeve securely mounted to the open end of said case.

9. The thermocouple assembly as set forth in claim 2 wherein said metal case is made of a refractory metal.

10. The thermocouple assembly as set forth in claim 9 wherein said metal case is made of molybdenum.

11. The thermocouple assembly as set forth in claim 2 wherein said metal washer is made of naval bronze.

12. The thermocouple assembly as set forth in claim 2 wherein said metal tube is made of stainless steel.

13. The thermocouple assembly as set forth in claim 1 wherein said securing means includes:

threads on the inner wall of said case extending from said inner support ledge to the open end of said case; and threads on the outside wall of said tube adjacent the first end of tube.

14. A thermocouple assembly, comprising: an outer sheath, comprising:

a molybdenum case having an open end and a closed end, an inner support ledge adjacent the open end and internal threads extending from the inner support ledge to the open end;

a navel bronze washer mounted on the inner support ledge of said molybdenum case; and a stainless steel tube having threads on the outer surface extending from one end for threading the one end of said steel tube into the open end of said molybdenum tube to urge said washer against the inner support ledge of said molybdenum tube, wherein heating said outer sheath a hermetic seal is formed at the union of said case and said tube capable of withstanding high pressures;

a thermocouple probe positioned in said outer sheath;

an inert atmosphere between said outer sheath and said probe; and means for forming a hermetic seal between said probe and said outer sheath to contain said inert atmosphere between said outer sheath and said probe.

* * * * *